J. M. KERR.
SHOCK ABSORBER.
APPLICATION FILED JULY 14, 1921.
1,417,177.
Patented May 23, 1922.
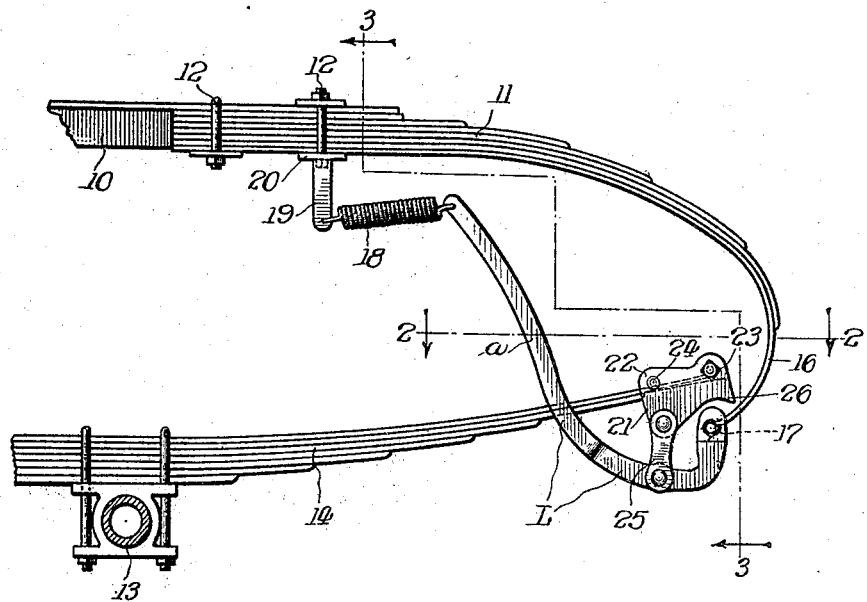
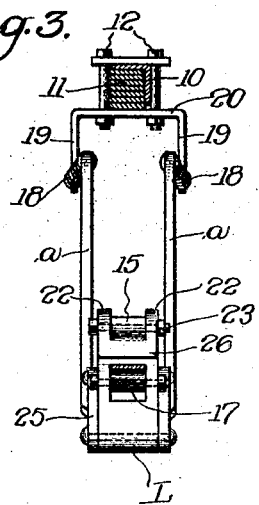
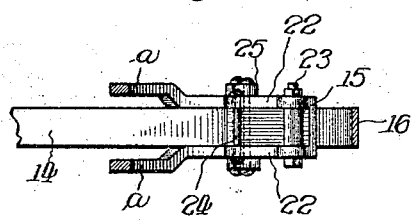
Witness:
A. J. Sauser.
Inventor:
James M. Kerr,
By Charles J. Schmidt
Atty.

UNITED STATES PATENT OFFICE.

JAMES M. KERR, OF CRAWFORDSVILLE, INDIANA.

SHOCK ABSORBER.

1,417,177.　　　　Specification of Letters Patent.　　Patented May 23, 1922.

Application filed July 14, 1921. Serial No. 484,643.

*To all whom it may concern:*

Be it known that I, JAMES M. KERR, a citizen of the United States, and a resident of Crawfordsville, in the county of Montgomery, State of Indiana, have invented certain new and useful Improvements in Shock Absorbers, of which the following is a specification.

My invention relates to shock absorber mechanism which is particularly useful and efficient on automotive vehicles of the side spring type. The important object of the invention is to provide a simple and inexpensive shock absorbing attachment which will efficiently take up and absorb the lesser and short vibration shocks during travel of the vehicle and which will efficiently smooth and pave the way for the operation of the vehicle springs to take up the heavier shocks. Another object of the invention is to provide such construction and arrangement that the recoil or rebound of the vehicle springs will be efficiently braked, snubbed and absorbed. A further object of the invention is to provide construction and arrangement which will permit attachment of the shock absorbing mechanism without interfering with the normal relative position of vehicle springs and without requiring rearrangement or reconstruction of such springs or vehicle parts.

On the accompanying sheet of drawing the construction, application and operation of my improved shock absorbing mechanism is clearly illustrated. On the drawing—

Fig. 1 is a side elevational view of one corner of a vehicle showing the shock absorbing mechanism applied to the vehicle springs, Fig. 2 is a plan view on plane 2—2, Fig. 1 and Fig. 3 is a sectional view on plane 3—3, Fig. 1.

On the drawing 10 represents one of the metal side beams of a vehicle chassis and 11 represents the quarter elliptic leaf spring secured at its butt end to the side beam by suitable clamping bolts 12. On the axle 13 is secured the semi-elliptic leaf spring 14, this spring at its outer end having the eye 15. The scroll end 16 of the quarter elliptic spring terminates in the eye 17 a short distance below the eye of the axle spring. In the original construction of the vehicle, the eye ends of the springs are secured together by a shackle member, but for the purpose of attaching my shock absorber mechanism, this shackle member is removed.

The shock absorber mechanism comprises a lever designated as a whole by L and pivoted or fulcrumed at its outer end on the end of the spring 11, the lever then deflecting a distance downwardly, then inwardly, and then upwardly past and above the axle spring, its bifurcations or arms *a* being connected by elastic members in the form of contractive springs 18 with the lower ends of arms 19 extending from the U frame or bracket 20 which is secured to the vehicle body by means of one of the clamping bolts 12 which secures the spring 11 to the chassis frame. A fitting 21 is secured on the end of the spring 14, this fitting having the sides 22 between which the end of the spring is received, these sides at their outer ends being perforated to receive the bolt 23 which extends also through the eye 15. To lock the fitting securely in place a pin 24 is driven through the sides just above the spring at the inner end of the fitting. Suspended from the lower inner end of the fitting is the link 25 which is pivoted to the inwardly extending section of the lever L a short distance inside of the fulcrum point of the lever, and this link may be the shackle which was taken from the vehicle to make way for application of the shock absorbing mechanism. The vehicle body is thus suspended from the spring 14 by means of the link 25 and the springs 18 resist swing of the lever as the vehicle springs compress during travel of the vehicle, the bracket 20 being inwardly of the lever ends.

As the vehicle travels over a roadway, the lesser and shorter vibration shocks are practically all absorbed by the springs 18 as the lever L vibrates during compression of the vehicle springs. The heavier and longer vibration shocks are eventually taken up by the vehicle springs but primarily the shock absorber attachment takes them on and smooths out and paves the way for their transmission to the vehicle springs. During normal operation of the vehicle the lever and the fitting 21 will not come into engagement, but should the vehicle springs tends to separate abnormally as when the wheels encounter a sudden steep bump or drop into a deep rut, the fulcrum end of the lever will engage with the fitting and the vehicle springs will then take care of such recoil or rebound shocks. The fitting 21 has the abutment point 26 at its lower outer corner but during normal operation of the vehicle springs, the upper end of the lever will be a distance inside of such point, and the lever and fitting will not engage. However, when the springs separate abnormally they will relax and this will cause shifting outwardly of the fulcrum end of the lever and shifting inwardly of the abutment point on the fitting to bring the lever and point into register and engagement. This engagement will therefore be effected before the vehicle springs have a chance to acquire detrimental rebound action and it gives the springs a chance to gradually take on and smoothly brake and snub the recoil action. By means of my attachment the lesser more disagreeable shocks are efficiently taken up by the shock absorber springs 18 and the vehicle springs are better adapted to take care of the recoil or rebound action.

The lever could have only one arm, but it is preferable to provide two arms, one at each side of the spring 14 and individual spring connection between the ends of each arm and the bracket 20. This arrangement produces operation which is more balanced and which avoids unequal friction.

Having described my invention, I claim the following:

1. In a vehicle, the combination with the axle, a leaf spring secured to the axle at right angles thereto and extending outwardly therefrom, a block secured to the front end of said spring, the vehicle body structure, a leaf spring secured to said structure at its butt end and extending outwardly and terminating below said block, a lever fulcrumed at its outer end on the end of said body structure spring, said lever extending inwardly and then upwardly past and above the axle spring a link pivoted on said block at the inner end thereof and pivoted to said lever a distance inwardly of the lever fulcrum point, an elastic connection between the upper end of said lever and the body structure, said elastic connection resisting swing of said lever during normal operation of said vehicle, said block forming an abutment for the fulcrumed end of said lever when said vehicle springs separate abnormally whereby the vehicle springs may resist and retard the recoil or rebound action.

2. In a vehicle, the combination with the axle, of a leaf spring secured to the axle at right angles thereto and extending outwardly therefrom, the vehicle framework, a leaf spring secured to said framework and extending parallelly over the axle spring and terminating below the end of the axle spring, a block rigidly secured on said axle spring and extending inwardly a distance from the spring end, a lever fulcrumed at its outer end on the end of the upper spring and below said block, a link supported on said block at the inner ends thereof and pivoted to said lever a distance inwardly from the fulcrum line of the lever, said lever at its inner end extending upwardly and past the axle spring, a shock absorbing spring connecting the upper end of said lever with said frame work inwardly of the lever, said block forming an abutment for the fulcrum end of said lever when said vehicle springs abnormally separate.

3. In a vehicle, the combination of the axle, a semi-elliptic spring secured on said axle at right angles thereto, the vehicle framework, a quarter elliptic spring secured at its butt end on said framework and extending parallelly over said axle spring and terminating below the end of said axle spring, the front end of said axle spring having an eye, a block on the front end of said axle spring, a bolt extending through said block and eye, a pin extending through said block and engaging with said spring to assist said bolt in holding said block rigidly on said spring, a lever fulcrumed at its outer end on the end of said upper spring, said lever extending inwardly below said block and then upwardly past and above the axle spring, a link pivoted on said block at the inner end thereof and pivoted to said lever inside of the vertical line of the fulcrum point, a bracket secured on the vehicle framework, and a shock absorber spring connecting between said bracket and the upper end of said lever, the outer end of said block forming an abutment for the fulcrum end of said lever when said vehicle springs separate.

4. In a vehicle, the combination of the axle, a semi-elliptic spring secured on said axle at right angles thereto, the vehicle framework, a quarter elliptical spring secured at its butt end on said framework and extending over said axle spring and terminating below the outer end of said axle spring, a block secured to and extending a distance inwardly from the outer end of said axle spring, a lever fulcrumed at its outer end on the end of said upper vehicle spring, said lever extending inwardly below said block and upwardly past the axle spring, a shock absorber spring connected with said lever and extending inwardly therefrom and secured to the framework, a link pivoted on said block at the inner end thereof and pivoted on said lever inwardly of the vertical fulcrum line, an abutment point at the outer end of said block, said abutment point and fulcrum end of the lever being normally out of vertical register but coming into vertical register when the springs abnormally separate whereby said abutment point will receive the fulcrum end of the lever and the vehicle springs will thereafter resist further separation thereof.

5. In a vehicle, the combination with the axle, a leaf spring secured to the axle and extending outwardly therefrom, a block secured to the front end of said spring, the vehicle body structure, a leaf spring secured to said structure at its butt end and extending outwardly and terminating below said block, a lever fulcrumed at its outer end on the end of said body structure spring, a link extending from the inner end of said block and pivoted to said lever a distance inwardly of its fulcrum point, an elastic connection between the inner end of said lever and the body structure, said elastic connection resisting swing of said lever during normal operation of said vehicle, and said block forming an abutment for the fulcrumed ends of said levers when said vehicle springs separate abnormally, whereby the vehicle springs may resist and retard recoil or rebound action.

In witness whereof, I hereunto subscribe my name this 9 day of July, A. D. 1921.

JAMES M. KERR.